United States Patent [19]

Morioka et al.

[11] Patent Number: 4,811,117
[45] Date of Patent: Mar. 7, 1989

[54] VIDEO TAPE RECORDER FOR RECORDING AND REPRODUCING TWO-CHANNEL COMPONENT SIGNALS OF A VIDEO SIGNAL ON A MAGNETIC TAPE USING TWO PAIR OF HEADS AND ALTERNATELY DELAYED SIGNALS

[75] Inventors: Yoshihiro Morioka, Neyagawa; Masaaki Kobayashi, Kawanishi; Yoshitomi Nagaoka, Neyagawa, all of Japan

[73] Assignee: Matsushita Electric Industrial Co., Ltd., Osaka, Japan

[21] Appl. No.: 947,411

[22] Filed: Dec. 24, 1986

[30] Foreign Application Priority Data

Dec. 26, 1985 [JP] Japan .................. 60-293822

[51] Int. Cl.$^4$ .............................................. H04N 9/79
[52] U.S. Cl. ................................. 358/310; 360/33.1; 360/64
[58] Field of Search ............... 358/310, 320, 330, 335, 358/323; 360/33.1, 64, 84, 36.2

[56] References Cited

U.S. PATENT DOCUMENTS

| | | | |
|---|---|---|---|
| 3,536,856 | 10/1970 | Kietz et al. ........................... | 360/84 |
| 3,781,463 | 12/1973 | Van den Bussche ........... | 358/310 X |
| 4,358,799 | 11/1982 | de Niet .................... | 360/84 |
| 4,419,698 | 12/1983 | Shiraishi et al. ............ | 358/330 |
| 4,463,390 | 7/1984 | Koga et al. .................... | 360/10.3 |
| 4,467,368 | 8/1984 | Horstmann .................... | 358/310 |
| 4,485,395 | 11/1984 | Warren ............. | 358/323 X |
| 4,614,985 | 9/1986 | Tsuruta .................... | 360/64 |
| 4,623,940 | 11/1986 | Matsumoto et al. ........ | 360/36.2 X |
| 4,656,527 | 4/1987 | Uchimi ............. | 358/310 X |
| 4,672,467 | 6/1987 | Heitmann ............. | 358/310 X |
| 4,677,498 | 6/1987 | Tsushima ................ | 358/310 |

FOREIGN PATENT DOCUMENTS

| | | |
|---|---|---|
| 0072507 | 2/1983 | European Pat. Off. . |
| 0167314 | 1/1986 | European Pat. Off. . |
| 0169910 | 2/1986 | European Pat. Off. . |
| 1274164 | 8/1968 | Fed. Rep. of Germany . |
| 3216027 | 12/1982 | Fed. Rep. of Germany . |
| 58-131885 | 8/1983 | Japan . |
| 59-4279 | 1/1984 | Japan . |
| 59-34785 | 2/1984 | Japan . |
| 59-104887 | 6/1984 | Japan . |
| 59-104886 | 6/1984 | Japan . |

OTHER PUBLICATIONS

A ½ Inch Metal–Cassette VTR System, Shinya Matsuda, Iwao Obata, Masahiko Matsui, NHK Engineering Headquarters, Matsushita Electric Ind. Co., Video System Division, vol. 9, No. 2, 5–1985.

Primary Examiner—Raymond F. Cardillo
Assistant Examiner—W. R. Young
Attorney, Agent, or Firm—Wenderoth, Lind & Ponack

[57] ABSTRACT

A video tape recorder for recording two-channel component signals of a video signal on a magnetic tape and for reproducing the recorded signals includes a recording signal processing system for processing the two-channel component signals into first and second recordable signals, an electromagnetic conversion system including two pairs of magnetic heads for recording the first and second recordable signals, respectively, on the magnetic tape and for reproducing the first and second recorded signals, respectively, and a reproduced signal processing system for processing the reproduced signals into representations of the original two-channel component signals. Each pair of heads of the two pairs of heads are disposed so as to be apart by 180° from each other on a rotary cylinder and so as to be apart by 90° from each head of the other pair of heads.

7 Claims, 9 Drawing Sheets

VIDEO TAPE RECORDER FOR RECORDING AND REPRODUCING TWO-CHANNEL COMPONENT SIGNALS OF A VIDEO SIGNAL ON A MAGNETIC TAPE USING TWO PAIR OF HEADS AND ALTERNATELY DELAYED SIGNALS

BACKGROUND OF THE INVENTION

1. Field of the Invention

This invention relates to a video tape recorder (VTR), and more particularly to a two-channel (2ch) VTR which records a video signal separated into two channel components on a magnetic tape and reproducing the recorded signal.

2. Description of the Prior Art

Conventional 2ch VTRs widely used for broadcasting record video signals on a magnetic tape via two pairs of rotary heads in such a manner that a frequency modulated (FM) luminance signal Y and an FM chrominance signal C are recorded on separate tracks which are arranged alternately in the order of Y, C, Y, C, Y, C. The FM chrominance signal is a signal which is obtained by time-base-compression-multiplexing two chrominance difference signals and frequency-modulating the multiplexed signal, or a signal which is obtained by frequency modulating two chrominance difference signals with different carrier frequencies and mixing the frequency-modulated signals (a so-called frequency-division-multiplexed signal), or a signal which is obtained by frequency-modulating so-called line sequential chrominance difference signals which appear alternately at a cycle of one horizontal scanning period, or other types of signals. These are shown in Japanese Laid-Open Patent Application (Kokai) Nos. 59-4279, 59-34785, 58-131885, 59-104886 and 59-104887. Each pair of heads are disposed to be apart by 180° from each other on a circumference of a rotary cylinder. Each head of each pair is disposed adjacent to one head of the other pair. A typical conventional 2ch VTR is shown in "A ½ INCH METAL-CASSETTE VTR SYSTEM" by S. Matsuda et al., Technical Report of the Institute of Television Engineers of Japan, Vol. 9, No. 2 (May, 1985), pp. 19–24.

Although the conventional 2ch VTRs can provide high quality video signals, they have the following disadvantages.

The conventional 2ch VTRs operate in only one fixed operation mode, i.e., standard mode, but cannot operate in special operation modes such as a long play mode. If they were required to operate in an additional operation mode, two additional two pairs of heads would have to be provided on the rotary cylinder, which would be very difficult or almost impossible.

Furthermore, the conventional 2ch VTRs, when recording, provide a guard band between each two adjacent signal tracks on the magnetic tape for eliminating crosstalk between the signals recorded on the adjacent signal tracks. This is disadvantageous for increasing recording density.

Furthermore, since two heads are disposed adjacent to each other, production and adjustment of the head system is very difficult, and a shield plate must be provided between two adjacent two heads for eliminating crosstalk between two adjacent two-heads. As the result, the head system of the conventional 2ch VTRs is too expensive to be applied to home use. This is the main reason that the 2ch VTRs have been used only for broadcasting.

SUMMARY OF THE INVENTION

An object of the present invention is to provide a two-channel video tape recorder capable of recording and reproducing video signals in not only a standard mode but also a play mode.

Another object of the present invention is to provide a two-channel video tape recorder capable of recording video signals on a magnetic tape with no guard band so as to thereby realize a high density recording of video signals.

Still another object of the present invention is to provide an inexpensive two-channel video tape recorder for home use.

To achieve these objects, a video tape recorder according to the present invention comprises: a recording signal processing means for processing two-channel component signals into first and second recordable signals; an electromagnetic conversion means including: first and second pairs of rotary magnetic heads for recording the first and second recordable signals, respectively, on the magnetic tape and for reproducing the first and second recorded signals, respectively, from the magnetic tape; each pair of heads being disposed to be apart by 180° from each other on a circumference of a rotary cylinder and apart by 90° from each head of the other pair of heads; and a reproduced signal processing means for processing the first and second reproduced signals to obtain the original two-channel component signals.

Preferably, the relative heights of the four heads in an axial direction of the rotary cylinder are the same so that the relative position of each signal track with respect to the other signal tracks on the magnetic tape will not change at, irrespective of the moving speed, i.e., in any operating mode of the video tape recorder.

The above and other objects, features and advantages of the invention will be apparant from the following description of the preferred embodiments taken in connection with the accompanying drawings in which:

DESCRIPTION OF THE PREFERRED EMBODIMENTS

Figure 1:
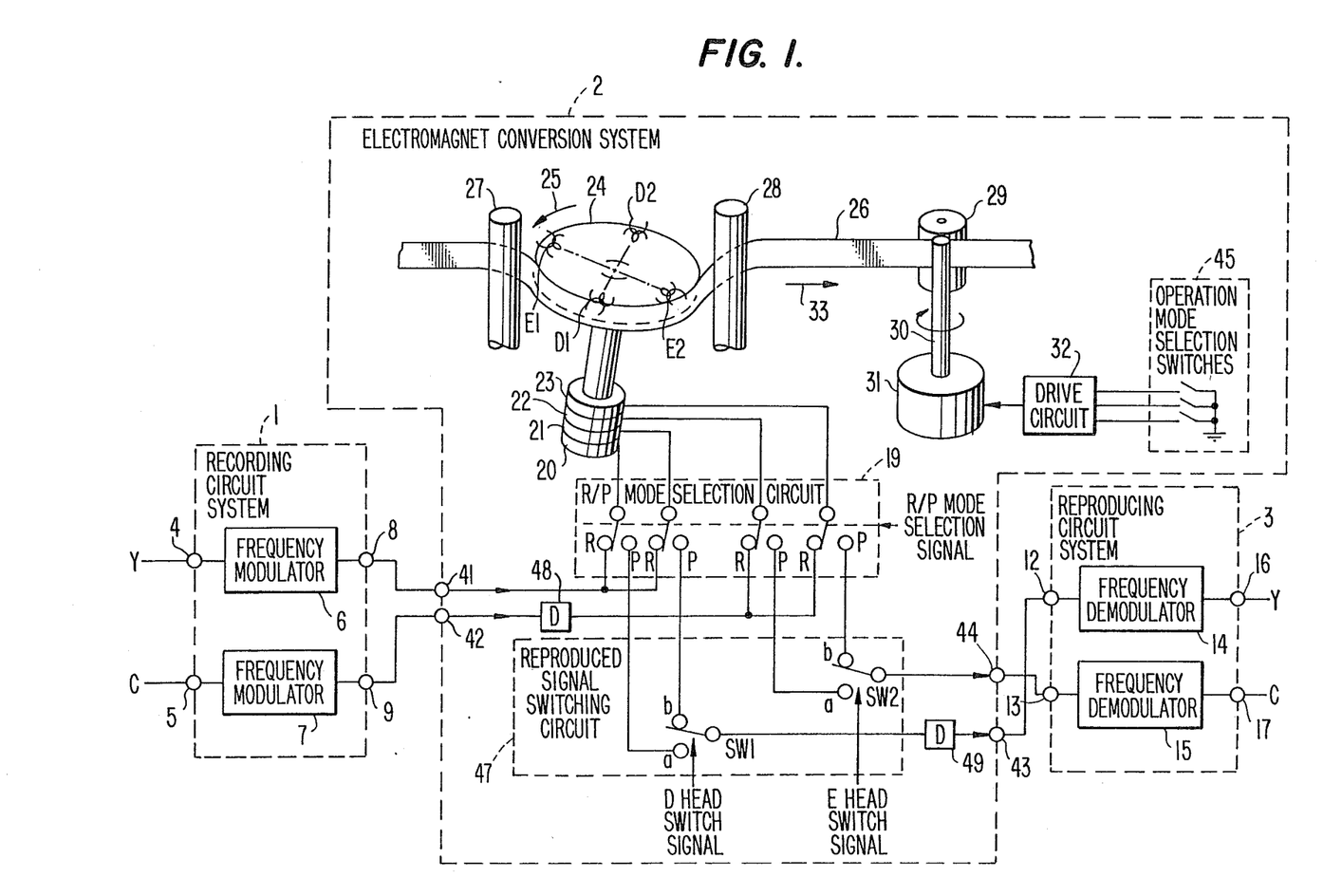
FIG. 1 is a schematic block diagram showing an embodiment of the present invention.

FIG. 1 shows a schematic block diagram of a two-channel video tape recorder according to the present invention. The video tape recorder in FIG. 1 is composed of a recording circuit system 1, an electromagnetic conversion system 2, and a reproducing circuit system 3. A luminance signal Y is applied to an input terminal 4 and a chrominance signal C is applied to an input terminal 5. Here, the chrominance signal C is a signal obtained by time-base-compression-multiplexing two chrominance difference signals and frequency-modulating the multiplexed signal.

The input luminance signal Y is frequency-modulated by a frequency modulator 6, outputted from an output terminal 8 of the recording circuit system 1 to be applied to an input terminal 41 of the electromagnetic conversion system 2. The chrominance signal C is also frequency-modulated by a frequency modulator 7, outputted from an output terminal 9 of the recording circuit system 1 to be applied to an input terminal 42 of the electromagnetic conversion system 2.

In a recording mode, changeover switches of a record/playback (R/P) mode selection circuit 19 select R terminals in response to an externally provided R/P mode selection signal. So, the frequency-modulated (FM) luminance signal passes through the R/P mode selection circuit 19, and is applied to a pair of magnetic heads D1 and D2 via rotary transformers 20 and 21 which are mounted on a rotary shaft of a rotary cylinder 24. The FM chrominance signal is delayed for ($\frac{1}{2}$)H (where H: one horizontal scanning period) by a delay circuit (D)48, passes through the R/P mode selection circuit 19, and is applied to another pair of magnetic heads E1 and E2 via rotary transformers 22 and 23 which are mounted on the rotary shaft of the rotary cylinder 24.

A magnetic tape 26 is driven by a capstan 30 rotated by a capstan motor 31 and a pinch roller 29 to move in direction 33. The speed of the capstan motor 31 is controlled by a drive circuit 32 according to an operation mode selection signal from operation mode selection switches 45 to change the moving speed of the magnetic tape 26. The magnetic tape 26 is guided by guide posts 27 and 28 to be wound on the rotary cylinder 24 in an angle of 180°.

Figure 2A:
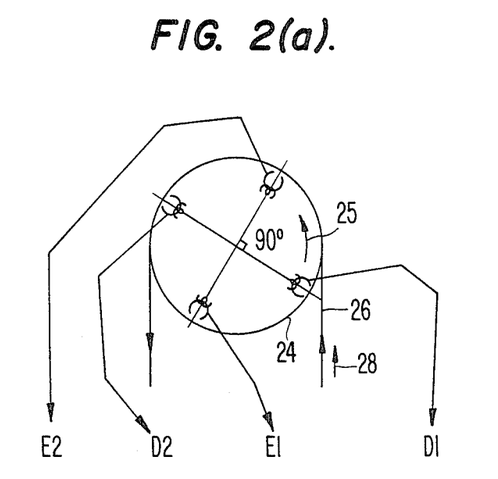
FIGS. 2(a) and 2(b) are top views and horizontally expanded views, respectively, of four rotary magnetic heads, for showing a head arrangement according to the present invention.

Referring to FIG. 2(a) which shows a top view of the arrangement of the magnetic heads on the rotary cylinder 24, the heads D1 and D2 are apart by 180° from each other, and the heads E1 and E2 are apart by 180° from each other. The heads D1 and E1 are apart by 90° from each other.

Figure 2B:
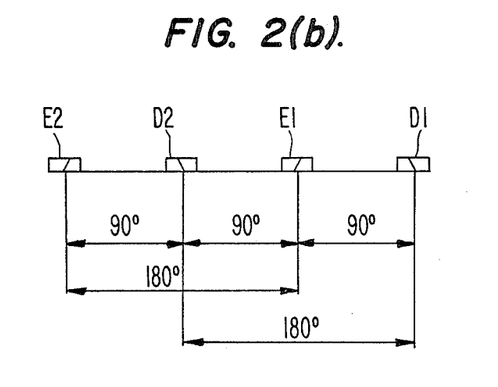

Referring to FIG. 2(b) which shows the arrangement of the magnetic head in a rotational direction 25 thereof, all of the four heads D1, D2, E1 and E2 are at a same height, or rotate on a same plane. The heads D1 and D2 have the same azimuth ($\alpha$), and the heads E1 and E2 have the same azimuth ($\beta$) which is different from, or preferably inverse ($-\alpha$) to, that of the heads D1 and D2. Here, all of the four heads D1, D2, E1 and E2 have a same width.

Slant azimuth recording is known to increase the recording density. The gaps of the recording heads for scanning adjacent tracks are tilted with respect to each other so that a crosstalk component from an adjacent track is attenuated due to azimuth loss. The azimuth loss is greater when the signal frequency is higher, or when the signal track is narrower, or when the azimuth angle difference is greater. Thus, the recording density can be increased by properly selecting the signal frequency, the signal track width and the azimuth angle difference.

Figure 3:
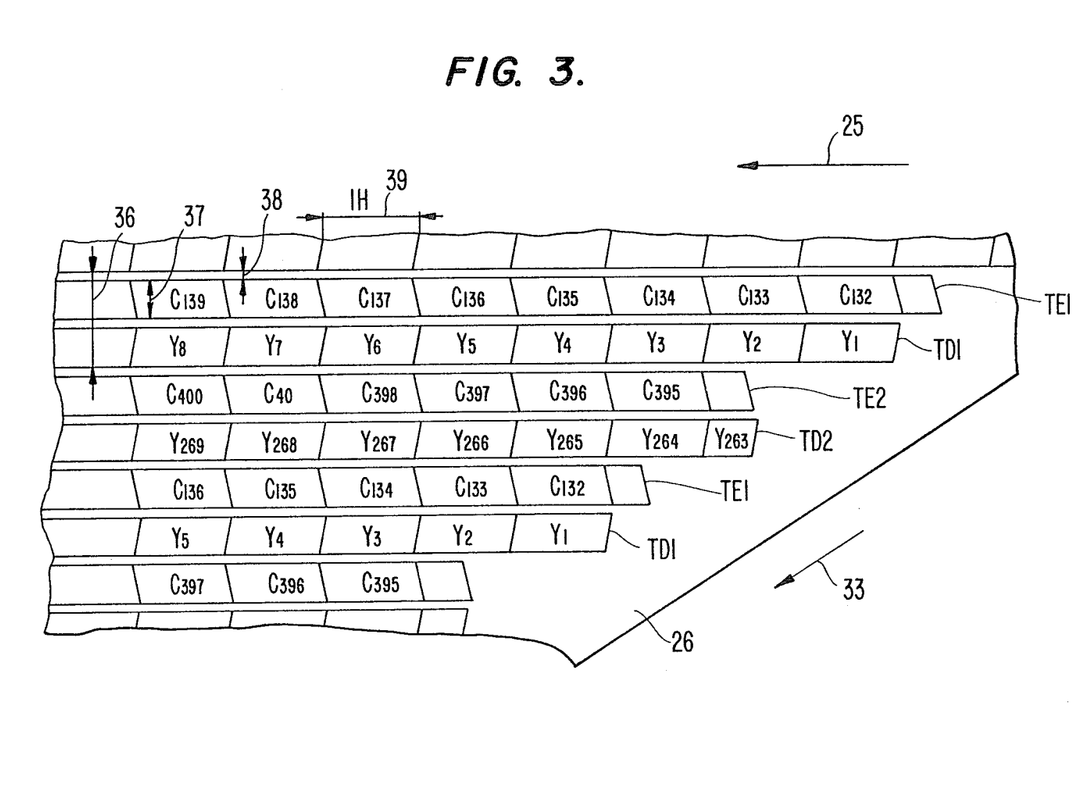
FIG. 3 is a track pattern diagram showing an example of a signal track pattern in a standard mode according to the present invention.

The rotary cylinder 24 turns half a turn (180°) in the direction 25 in a time corresponding to one field of the video signal, during which time the magnetic tape 26 is moved for a distance 36 in a direction 33 as shown in a track pattern diagram in FIG. 3.

During first and second quarter (90°) turns of the rotary cylinder 24, the magnetic head D1 scans the magnetic tape 26 to record the FM luminance signal in a first field in each frame. During second and third quarter (90°) turns of the rotary cylinder 24, the magnetic head E1 scans the magnetic tape 26 to record the FM chrominance signal in a second-half of a first field and a first-half of a second field in each frame. During third and fourth quarter (90°) turns of the rotary cylinder 24, the magnetic head D2 scans the magnetic tape 26 to record the FM luminance signal in a second field in each frame. During fourth and next first quarter (90°) turns of the rotary cylinder 24, the magnetic head E2 scans the magnetic tape 26 to record the FM chrominance signal in a second-half of a second field in each frame and a first-half of a first field in a next frame.

Referring to FIG. 3, signal tracks TD1 are recorded by the head D1, signal tracks TE1 are recorded by the head E1, signal tracks TD2 are recorded by the head D2, and signal tracks TE2 are recorded by the head E2.

In FIG. 3, there exist guard bands 38, so the track width 37 is narrower than a half of the distance 36. In FIG. 3, symbols Y and C respectively indicate the luminance and chrominance signals, and each suffix indicates a horizontal line number. Numeral 39 indicates a distance corresponding to 1H.

Figure 4:
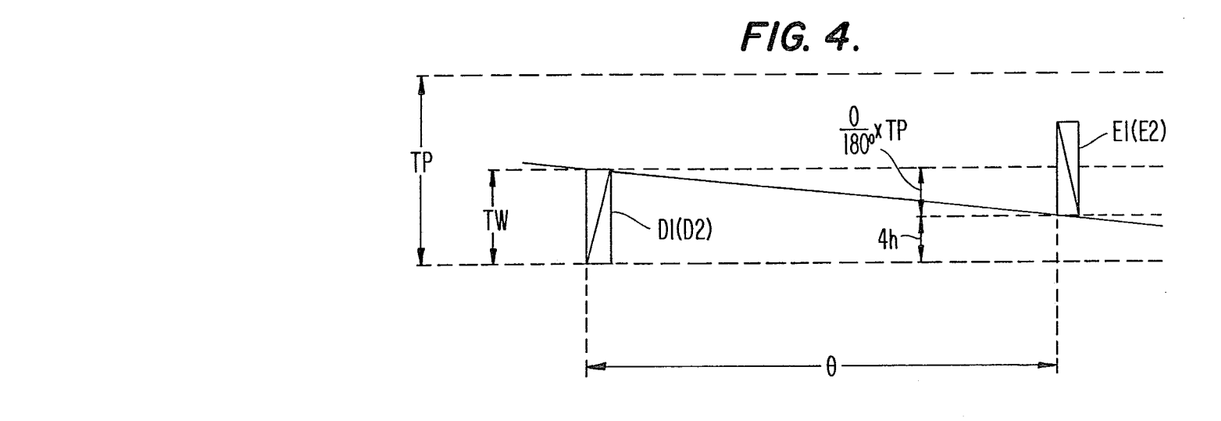
FIG. 4 is a head disposition diagram for deriving a condition which gives similar track patterns in any tape moving speed mode.

Now, consider a case in which the track pattern when the magnetic travels at 1/n (n: any integer larger than 1) of the tape speed in the standard operation mode (i.e., in the case of the long play mode) becomes similar to that in the standard operation mode with reference to FIG. 4. Suppose that the angular distance (in the rotational direction) between the head D1(D2) and E1(E2) is $\theta°$, the relative height difference between the head D1(D2) and E1(E2) is $\Delta h$, the track width in the standard mode is TW1, the track pitch (i.e.—moving distance of the tape during, a 180° turn of the rotary cylinder) in the standard mode is TP1, the track width in the long play mode is TW2, and the track pitch in the long play mode is TP2. In general, at a position in the rotational direction, the relative height difference between the head D1(D2) when passing the position and the head E1(E2) when passing the position is expressed by $\Delta h + \theta/180 \times TP$ (TP: track pitch). The conditions to make the track patterns in the standard and long play modes to be similar to each other are expressed as follows:

$$\Delta h = \frac{\theta}{180} \times TP1 = TW1 \tag{1}$$

-continued $$\Delta h + \frac{\theta}{180} \times TP2 = TW2 \quad (2)$$

From equations (1) and (2), the following equation is obtained:

$$\frac{\theta}{180} = \frac{TW1 - TW2}{TP1 - TP2}$$

For making the track patterns in the two modes to be similar to each other, the relationships expressed as TW2=TW1/TW1 and TP2=TP1 should be satisfied. Thus, the following equation is obtained:

$$\frac{\theta}{180} = \frac{TW1}{TP1} = \frac{TW2}{PT2} \quad (3)$$

As described before, according to the present invention, $\theta$ and $\Delta h$ satisfy the following condition:

$$\left. \begin{array}{l} \theta° = 90° \\ \Delta h = 0 \end{array} \right\} \quad (4)$$

Thus, the following result is obtained:

$$\left. \begin{array}{l} TW1 = \frac{1}{2} TP1 \\ TW2 = \frac{1}{2} TP2 \end{array} \right\} \quad (5)$$

Figure 5:
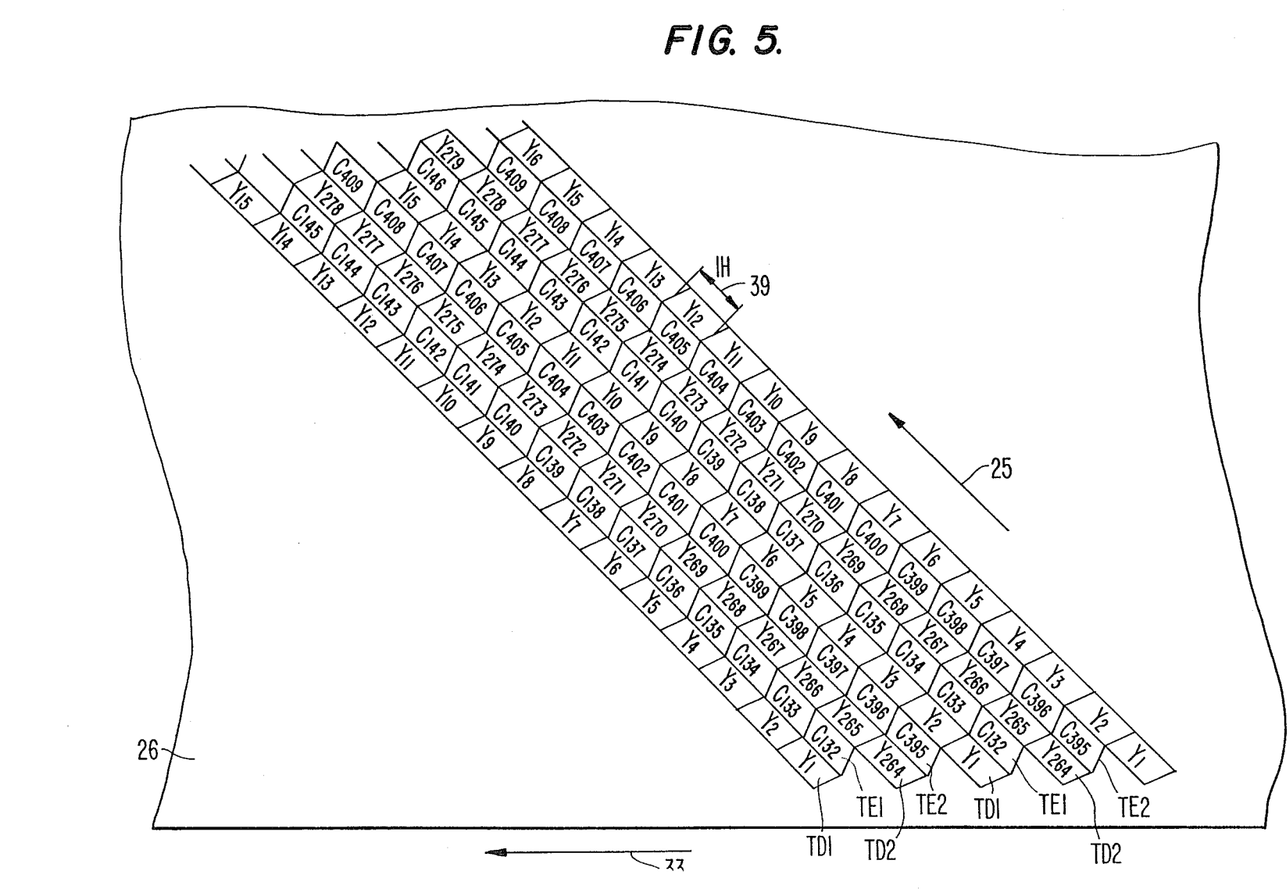
FIG. 5 is a track pattern diagram showing an example of a signal track pattern in a long play mode according to the present invention.

This means that no track will be overwritten on an another adjacent track at any tape speed in any long play mode. FIG. 5 shows an example of signal track pattern in a long play mode, in which tracks TD1, TE1, TD2 and TE2 are recorded by the heads D1, E1, D2 and E2, respectively. Since no track is overwritten on another track, there will be no fear that a track would be erased or made narrower in a long play mode.

Referring again to FIG. 1, in the playback mode, the recorded signals are reproduced by the same heads as those used for recording. The changeover switches of the R/P mode selection circuit 19 select P terminals in response to the R/P mode selection signal. So, the reproduced signals from the heads D1, D2, E1 and E2 pass through the R/P mode selection circuit 19 and are applied to a reproduced signal switching circuit 47. A change-over switch SW1 in the switching circuit 47 is responsive to an externally given D-head switch signal which indicates which one of the heads D1 and D2 is scanning the magnetic tape for operating in such a way to select a terminal a in a first field of each frame to pass the reproduced FM luminance signal from the head D1 and a terminal b in a second field of the frame to pass the reproduced FM luminance signal from the head D2. A change-over switch SW2 in the switching circuit 47 is responsive to an externally provided E-head switch signal which indicates which one of the heads E1 and E2 is scanning the magnetic tape for operating in such a way to select a terminal a in a second-half of a first field and a first-half of a second field in each frame to pass the reproduced FM chrominance signal from the head E1 and a terminal b in a second-half of the second field of the frame and a first-half of a first field of next frame to pass the reproduced FM chrominance signal from the head E2.

The reproduced FM luminance signal passed through the switch SW1 is delayed for ($\frac{1}{2}$)H by a delay circuit (D)49, and outputted from an output terminal 43 of the electromagnetic conversion system 2. The reproduced FM chrominance signal passed through the switch SW2 is directly outputted from an output terminal 44 of the electromagnetic conversion system 2.

The FM luminance signal outputted from the electromagnetic conversion system 2 is inputted to an input terminal 43 of the reproducing circuit system 3, and frequency-demodulated by a frequency demodulator 14 to form a representation of the original luminance signal Y, which is outputted from an output terminal 16. The FM chrominance signal outputted from the electromagnetic conversion system 2 is inputted to an input terminal 44 of the reproducing circuit system 3, and is frequency-demodulated by a frequency demodulator 15 to form a representation of the original chrominance signal C, which is outputted from an output terminal 17.

Referring to FIGS. 3 and 5, on each part between the two adjacent one-field-signal recorded parts of each track is recorded a horizontal synchronizing signal which has a large power. If the horizontal synchronizing signal recorded part was adjacent to a signal recorded part in a direction perpendicular to the head moving direction 25, the horizontal synchronizing signal would cause a bad influence on the adjacent signal as a crosstalk signal. But, in the track pattern as shown in FIG. 3 or 5 obtained according to the present invention, each horizontal synchronizing signal is recorded so as to be adjacent to another horizontal synchronizing signal in the direction perpendicular to the head moving direction, so that the recorded FM luminance and chrominance signals will not be affected by the crosstalk of the horizontal synchronizing signal.

Figure 6:
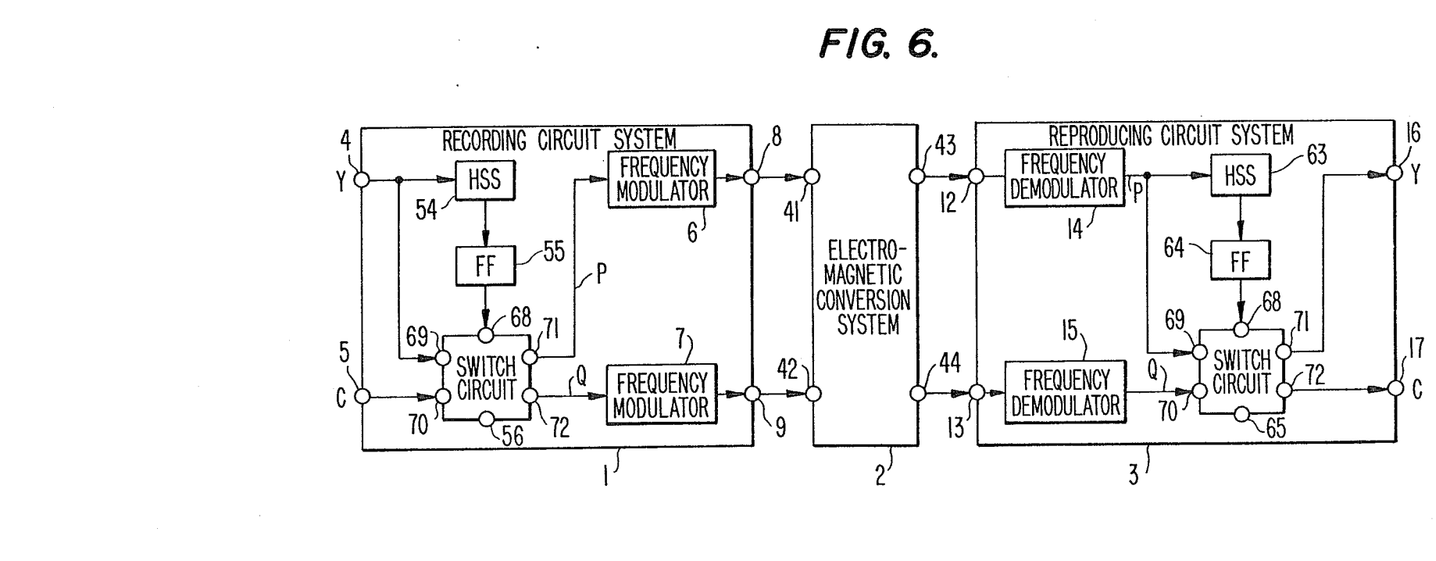
FIG. 6 is a schematic block diagram showing another embodiment of the present invention.
Figure 8:
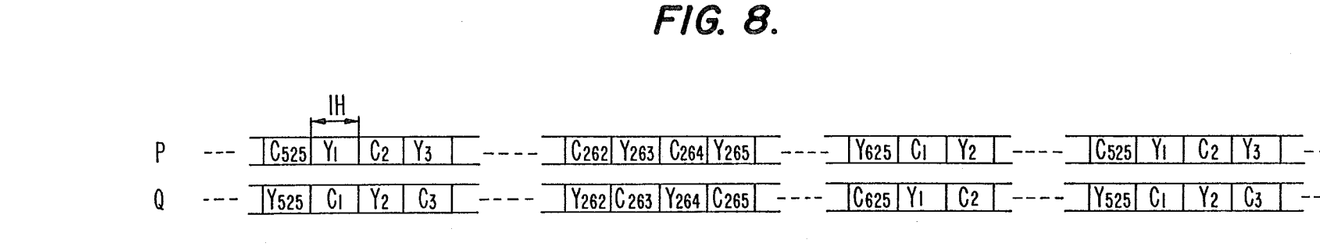
FIG. 8 is a signal sequence diagram showing two combined signals produced in the embodiment of FIG. 6.

FIG. 6 shows another embodiment of the present invention, in which the electromagnetic conversion system 2 has the same configuration as that of the embodiment shown in FIG. 1. The input luminance signal Y and chrominance signal C are exchanged at intervals of H by a switch circuit 56 so as to be converted to two combined signals P and Q shown in FIG. 8. Each of the combined signals P and Q contains the luminance signal and chrominance signal which appear alternately at the periods of H.

Figure 7:
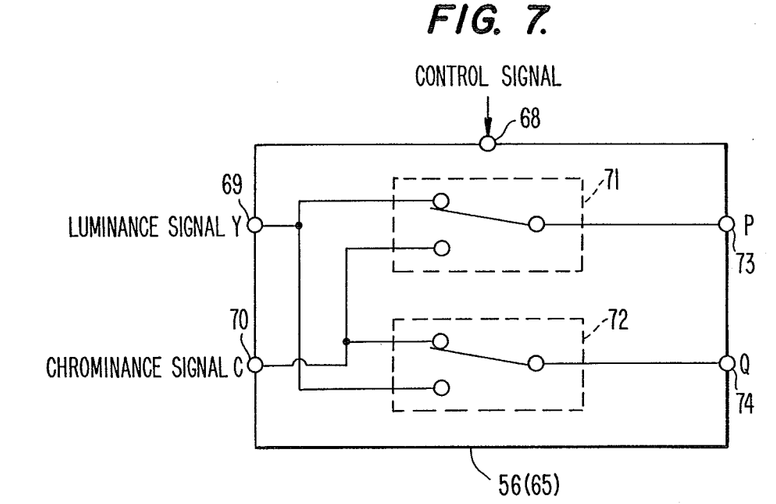
FIG. 7 is a schematic circuit diagram of a switch circuit used in the embodiment of FIG. 6.

Referring to FIG. 7, the switch circuit 56 comprises two changeover switches 71 and 72 which are periodically changed over in response to a control signal which inverts its level at intervals of H. Thus, the luminance and chrominance signals inputted respectively to input terminals 69 and 70 are converted to the two combined signals P and Q which appear respectively at output terminals 73 and 74.

Referring back to FIG. 6, the control signal is produced from the horizontal synchronizing signals in the input luminance signal Y by a circuit composed of a horizontal synchronizing signal separation (HSS) circuit 54 and a flip-flop (FF) circuit 55. The HSS circuit 54 separate the horizontal synchronizing signals from the input luminance signal Y. The FF circuit 55 is triggered by the separated horizontal synchronizing signals to produce the control signal which is applied to a control terminal 68 of the switch circuit 56.

The combined signals P and Q are respectively frequency-modulated by the frequency modulators 6 and 7, and applied to the input terminals 41 and 42 of the electromagnetic conversion system 2. In the electromagnetic conversion system 2, the two FM combined signals are recorded on the magnetic tape in the same way as described in connection with the embodiment of FIG. 1.

Figure 9:
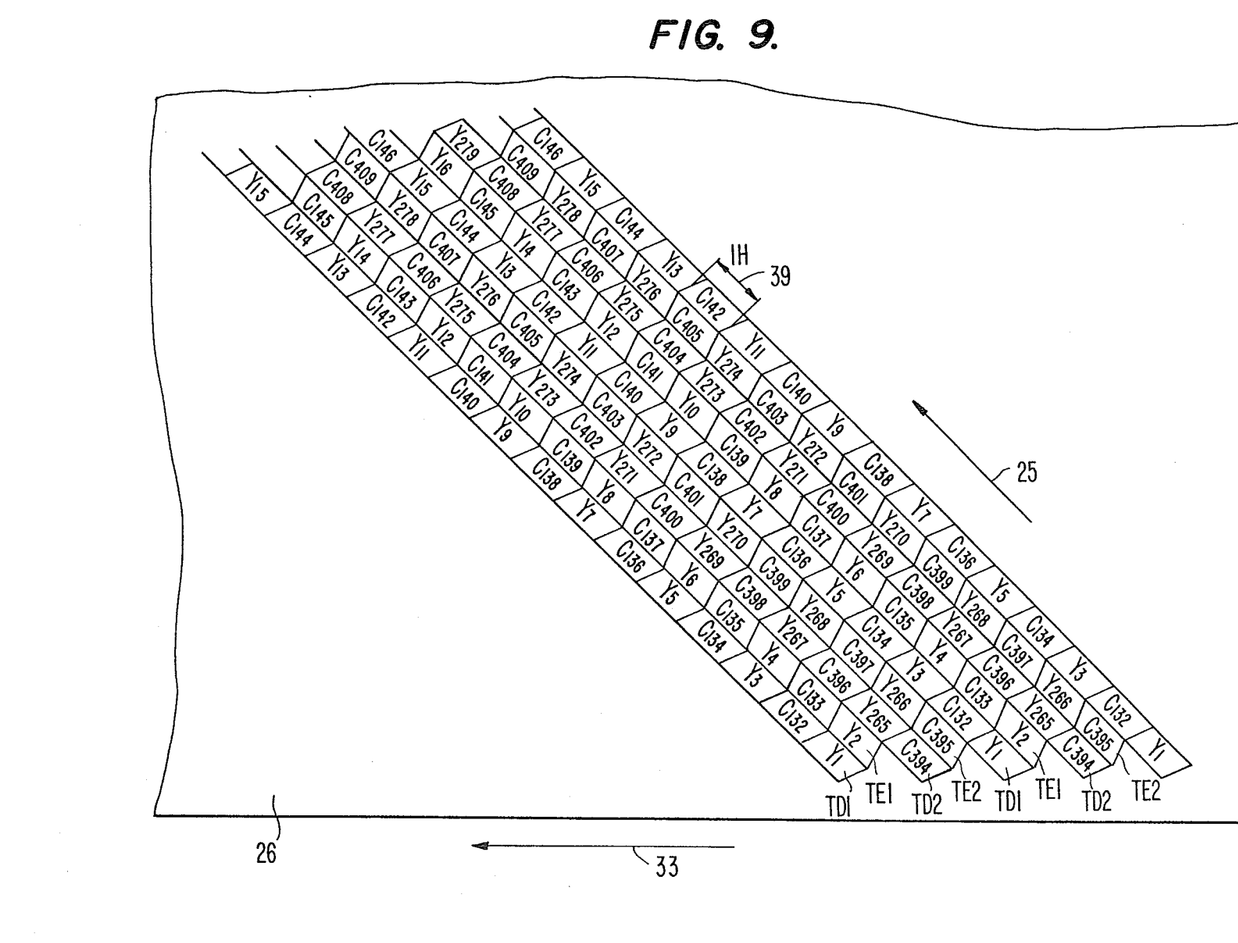
FIG. 9 is a track pattern diagram showing an example of a signal track pattern according to the embodiment of FIG. 6.

FIG. 9 shows a track pattern showing the signal track pattern in the standard mode obtained by the embodiment of FIG. 6. The tracks TD1, TE1, TD2 and TE2 are respectively recorded by the heads D1, E1, D2 and E2. The parts on which a same kind of signal (Y or C) is recorded are aligned in the direction perpendicular to the head moving direction 25. In other words, a luminance signal recorded part is adjacent to another luminance signal recorded part and a chrominance signal recorded part is adjacent to another chrominance signal recorded part in the head width direction. According to the frequency modulation theory, the influence of crosstalk decreases in inverse proportion to the frequency difference from the carrier frequency. In the track pattern shown in FIG. 9, since the same kind of signal is recorded on the parts adjacent to each other in the head width direction, the influence of crosstalk is minimized. Therefore, the signals recorded on each track will hardly be affected by the crosstalk from the signals recorded on an adjacent track.

Referring again to FIG. 6, in the playback mode the recorded FM combined signals are reproduced and outputted from the output terminals 43 and 44 of the electromagnetic conversion system 2 in the same way as described in connection with the embodiment of FIG. 1. The reproduced FM combined signals are frequency-demodulated by the frequency-demodulators 14 and 15, and reconverted, to the original luminance and chrominance signals Y and C by a circuit which comprises a switch circuit 65 having the same configuration as that of FIG. 7, a HSS circuit 63 and a FF circuit 64 and which functions in the same way as the circuit comprising the switch circuit 56, the HSS circuit 54 and the FF circuit 55.

The embodiment in FIG. 6 can operate in any long play mode to provide a track pattern similar to that shown in FIG. 9. Furthermore, the changeover period H may be changed to mH (m: any integer larger than one).

Figure 10:
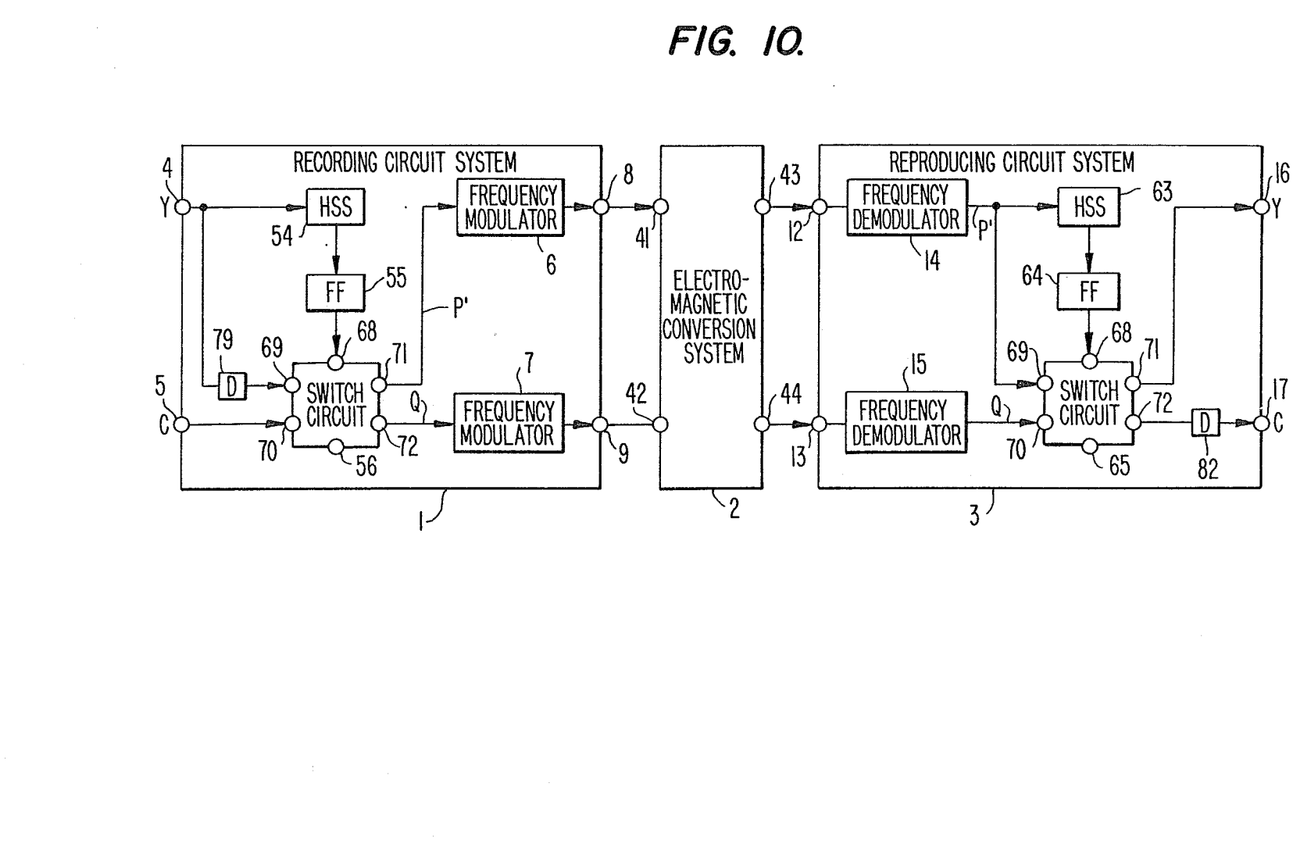
FIG. 10 is a schematic block diagram showing still another embodiment of the present invention.
Figure 11:
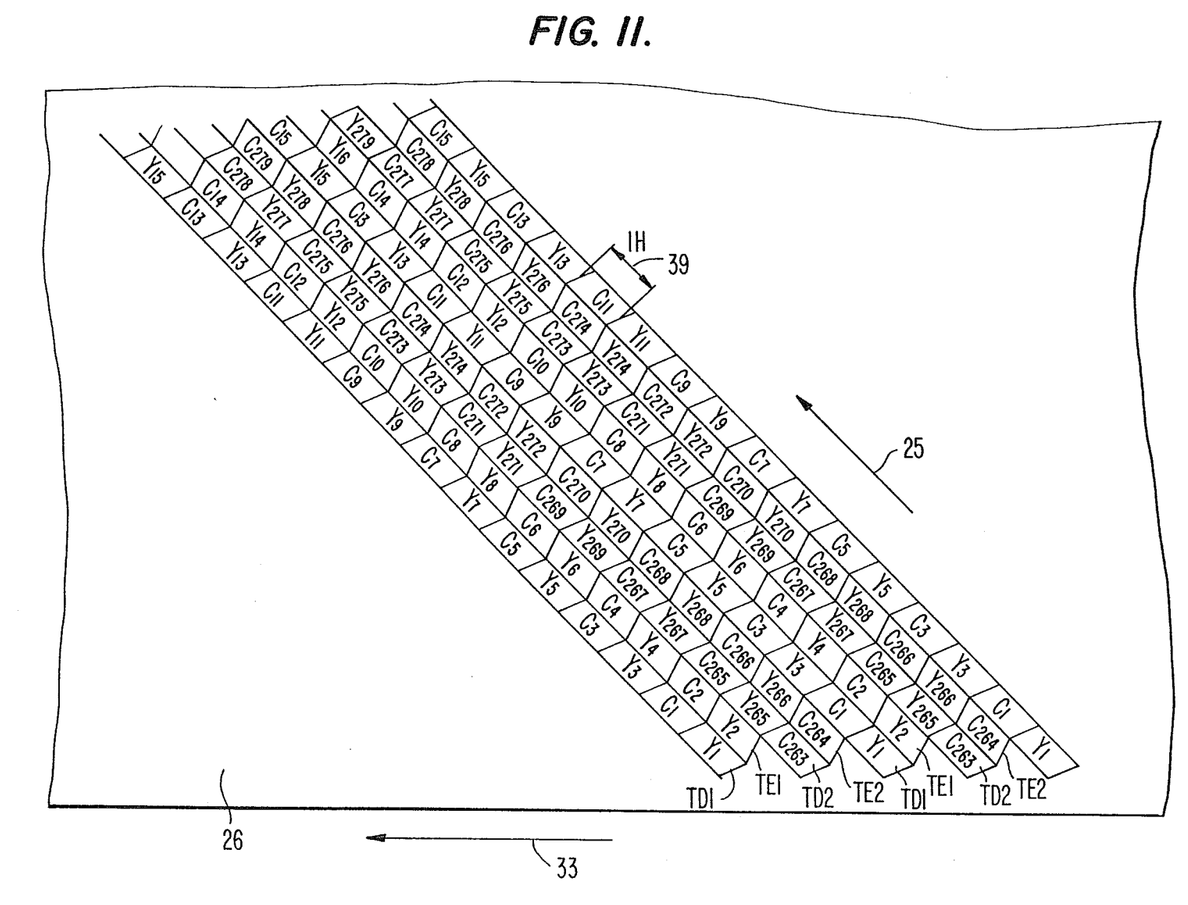
FIG. 11 is a track pattern diagram showing an example of a signal track pattern according to the embodiment of FIG. 10.

FIG. 10 shows still another embodiment of the present invention for realizing a track pattern shown in FIG. 11. This embodiment is different from the embodiment of FIG. 6 in that a delay circuit (D)79 for delaying the input luminance signal Y for a half field (131H or 132H in NTSC) is provided after the input terminal 4, and that a delay circuit (D)82 for delaying the chrominance signal outputted from the output terminal 72 of the switch circuit 65 for a half field (132H or 131H in NTSC) is provided before the output terminal 17. Furthermore, the rotating phase of the rotary cylinder (24 in FIG. 1) is delayed for 90° from that in the embodiment of FIG. 6. With this arrangement, the track pattern as shown in FIG. 11 can be obtained.

In the track pattern shown in FIG. 11, the parts of the luminance and chrominance signals contained in a same part of the video signal are adjacent to each other on each track. For example, on the track TE1, $Y_1$ and $C_1$ are adjacent to each other. This track pattern is advantageous to be a standard track pattern for allowing various types of video tape recorders have compatibility to one another.

In the embodiments of FIG. 6 and FIG. 10, the rates of the luminance and chrominance signals in each of the combined signals P and Q are equal to each other. But, the rates may be changed to be different from each other.

In the above description, the luminance and chrominance signals are used as the 2ch component signals. But, the present invention can be applied to any other types of 2ch component signals. For example, the present invention can be applied to the MAC signals developed in Europe.

What is claimed is:

1. A video tape recorder for recording two-channel component signals of a video signal on a magnetic tape and reproducing the recorded signals, comprising:
   a recording signal processing means for processing said two-channel component signals into first and second recording signals;
   an electromagnetic conversion means including: first and second pairs of magnetic heads for recording said first and second recordable signals, respectively, on said magnetic tape and for reproducing the first and second recorded signals, respectively, from said magnetic tape; a delay means for delaying only said second recordable signal of said first and second recordable signals for a predetermined time before being recorded so that each horizontal synchronizing signal is recorded adjacent to another horizontal synchronizing signal in a direction perpendicular to the head moving direction on said magnetic tape; and another delay means for delaying only the first reproduced signal of the first and second reproduced signals for said predetermined time so as to compensate for the time difference caused by the delay of said second recordable signal, each pair of heads of said two pairs of heads being disposed apart by 180° from each other on a rotary cylinder and apart by 90° from each head of the other pair of heads, relative heights of the heads in each pair of said two pairs of heads in an axial direction of said rotary cylinder being the same, and the widths of said two pairs of heads being the same; and
   a reproduced signal processing means for processing the first and second reproduced signals into two-channel component signals.

2. A video tape recorder according to claim 1, wherein the heads in each pair of said two pairs of heads have a same azimuth angle which is different from that of the heads in the other pair of heads.

3. A video tape recorder according to claim 1, wherein said predetermined time is selected to be H/2, where is one horizontal scanning period.

4. A video tape recorder for recording two-channel component signals of a video signal on a magnetic head and reproducing the recorded signals, comprising:
   a recording signal processing means comprising: a first switch means for exchanging said two-channel component signals at intervals of mH, where m denotes any integer and H denotes one horizontal scanning period, so as to obtain two obtain two combined signals each containing said two-channel component signals which occur alternately at periods of mH; and a means for processing said two combined signals into first and second recordable signals, respectively;
   an electromagnetic conversion means including: first and second pairs of rotary magnetic heads for recording said first and second recordable signals, respectively, on said magnetic tape and for reproducing the first and second recorded signals, respectively; a delay means for delaying only said second recordable signal of said first and second recordable signals for a predetermined time before being recorded so that each horizontal synchronizing signal is recorded adjacent to another horizontal synchronizing signal in a direction perpendicular to the head moving direction on said magnetic tape; and another delay means for delaying only the first reproduced signal of the first and second reproduced signals for said predetermined time so as to compensate for the time different caused by the delay of said second recordable signal, each pair of heads of said two pairs of heads being disposed apart by 180° from each other on a rotary cylinder and apart by 90° from each head of the other pair of heads, relative heights of the heads in each pair of said two pairs of heads in an axial direction of said rotary cylinder being the same, and the widths of said two pairs of heads being the same; and a reproduced signal processing means comprising: means for processing the first and second reproduced signals into said two combined signals; and a switch means for exchanging said two combined signals at intervals of mH to obtain two-channel component signals.

5. The video tape recorder according to claim 4, wherein one of said two-channel component signals is a luminance signal and the other of said two-channel component signals is a chrominance signal.

6. A video tape recorder according to claim 4, wherein the heads in each pair of said two pairs of heads have a same azimuth angle which is different from that of the heads in the other pair of heads.

7. A video tape recorder according to claim 4, wherein said predetermined time is selected to be H/2, where H is one horizontal scanning period.

* * * * *